US005633660A

United States Patent [19]

Hansen et al.

[11] Patent Number: 5,633,660

[45] Date of Patent: May 27, 1997

[54] INTEGRATED TOUCH SCREEN INPUT DEVICE

[75] Inventors: Peter K. Hansen; Lars Kragh, both of Stamford, Conn.

[73] Assignee: Trinitech Systems Inc., Stamford, Conn.

[21] Appl. No.: 430,887

[22] Filed: Apr. 28, 1995

Related U.S. Application Data

[63] Continuation of Ser. No. 17,019, Feb. 12, 1993, abandoned.

[51] Int. Cl.[6] .......... G09G 5/00

[52] U.S. Cl. .......... 345/173; 345/179; 345/156; 345/905

[58] Field of Search .......... 345/173, 156, 345/174, 175, 179, 905; 341/22; 178/18–19

[56] References Cited

U.S. PATENT DOCUMENTS

| | | | |
|---|---|---|---|
| 3,911,215 | 10/1975 | Hurst et al. | 178/18 |
| 4,017,848 | 4/1977 | Tannas, Jr. | 345/173 |
| 4,689,446 | 8/1987 | Hasegawa et al. | 178/18 |
| 4,707,845 | 11/1987 | Krein et al. | 345/173 |
| 4,812,830 | 3/1989 | Doering | 340/712 |
| 4,821,029 | 4/1989 | Logan et al. | 340/712 |
| 4,848,876 | 7/1989 | Yamakawa | 350/331 R |
| 4,990,900 | 2/1991 | Kikuchi | 340/712 |

FOREIGN PATENT DOCUMENTS

| | | | |
|---|---|---|---|
| 59-218541 | 12/1984 | Japan | G06F 3/033 |

*Primary Examiner*—Richard Hjerpe
*Assistant Examiner*—Vui T. Tran
*Attorney, Agent, or Firm*—Ohlandt, Greeley, Ruggiero & Perle

[57] ABSTRACT

An integrated input device which comprises: a contact sensor capable of producing an analog signal indicative of the location of the position which is touched; an A/D converter capable of receiving the analog signal output from the contact sensor and converting it to a digital signal; a computer capable of receiving the digital signal output from the converter, interpreting the digital signal and transmitting a digitized video signal in response to the digital signal; a video connector capable of receiving the digitized video signal output from the computer; and a display which is capable of receiving the output from the video connector.

6 Claims, 9 Drawing Sheets

4
8
2
5
12
12
12
12
10
16
20
6

INTEGRATED TOUCH SCREEN INPUT DEVICE

This application is a continuation of Ser. No. 08/017,019, filed on Feb. 12, 1993, abandoned.

The present invention relates generally to a horizontally disposed input device which is particularly useful in entering and retrieving trades or orders of tradable instruments, such as, government securities, equities, precious metals, currencies, commodities and futures, and options, securities and financial data from associated computers by the simple touch of a finger against a touch tablet including a contact sensor screen disposed on top of a flat medium display unit so as to give the user the impression that he is touching and changing objects that appear on the display.

BACKGROUND OF THE INVENTION

Most banks, securities firms and brokerage houses require traders to enter an impending trade on a paper ticket which is then physically delivered to back office data entry personnel for input into the firm's mainframe or personal computer upon receipt or after the trade. This ticketing system necessitates the use of position clerks and data entry personnel as intermediates between the trader and the data entry which substantially increases the cost and subjects the trade to human error. Moreover, the time lag between recording of the trade which establishes a firm trading position can cost clients substantially amounts of money, especially when trading extremely volatile stocks and bonds.

Using the latest flat panel high resolution color liquid crystal display, plasma and touch screen technologies, the present invention provides an integrated input device which permits traders to quickly enter trades, retrieve trading data and call up on-line vendor services all at the touch of a finger. Traders benefit from the speed and ease-of-use. Management benefits from the enormous improvements in risk management and utilization of the firm's capital.

By connecting traders directly to the firm's back office computer systems, the present invention provides a true, "ticketless," single entry trading system that revolutionizes the economics of trading operations. Moreover, operation costs are substantially reduced by the elimination of position clerks and data entry personnel.

This unique input device provides for a more intuitive user interface, renders typing skills obsolete, fulfills the promise of the mouse by making pointing and executing commands a reality and its compact, ergonomic design is a pleasure to operate, even for prolonged periods.

This touch screen input device is designed to integrate with most mainframe computer configurations. All the industry standard networking protocols can be built in so as to make the system fully compatible with the full range of operating systems. As such, it gives traders and primary dealers, as well as financial management, real-time access to profit and loss information and monitor risk exposure as it changes minute to minute.

The present invention also provides many additional advantages which shall become apparent as described below.

SUMMARY OF THE INVENTION

An integrated input device which comprises: a contact sensor means capable of producing an analog signal indicative of the location of the position which is touched; a converter means capable of receiving the analog signal output from the contact sensor means and converting it to a digital signal; a computer means capable of receiving the digital signal output from the converter means, interpreting the digital signal and transmitting a digitized video signal in response to the digital signal; a video connector means capable of receiving the digitized video signal output from the computer means; and a display means which is capable of receiving the output from the video connector. The contact sensor means, e.g., a flat tablet, is preferably disposed above a flat or substantially horizontally disposed flat display means.

It is preferable that the contact sensor means be a touch screen comprising a glass plate with a transparent, electrically resistive coating on a first side; a gas-tight electrical contact means disposed about the coating in such a manner as to permit it to be used as a highly stable linear voltage divider for both the X and Y axes; and a contact sheet with a transparent conductive coating on a second or opposite side disposed above glass plate, the contact sheet has separator points disposed about its inside surface such that the contact sheet is not in direct contact with the glass plate.

Furthermore, the present invention includes a controller circuit, normally incorporated together with the analog-to-digital converter, which is capable of impressing the voltage gradient across the resistive coating on the glass plate of the touch screen, alternating between the X and Y directions.

Still another object of the present invention is a touch screen input device which comprises: an upper housing portion; a lower housing portion; a contact sensor means disposed between the upper housing portion and the lower housing portion; a first insulator means disposed between the upper surface of the contact sensor means and the inner surface of the upper housing portion; a lower support means disposed between the lower surface of the contact sensor means and the inner surface of the lower housing portion; a second insulator means disposed between the contact sensor means and the lower support means; a display means disposed between the lower support means and the lower housing portion; a first communication means capable of transmitting signals from the contact sensor means to an externally disposed computer means; and a second communication means capable of transmitting signals from the externally disposed computer means to the display means.

A further object of the present invention is a method of data entry or input which comprises: touching a contact sensor means to produce an analog signal indicative of the location of the position which is touched; converting the analog signal output from the contact sensor means to a digital signal; sending the digital signal to a computer means; interpreting the digital signal; sending a digitized video signal output from the computer means to a video connector means in response to the digital signal; and displaying the digitized video signal output on a display.

Other and further objects, advantages and features of the present invention will be understood by reference to the following specification in conjunction with the annexed drawings, wherein like parts have been given like numbers.

DESCRIPTION OF THE PREFERRED EMBODIMENTS

This unique touch screen input device comprises three major components, i.e., a contact sensor or touch screen, a flat panel display unit and a computer. The system operates by having the user touch the touch screen with a finger or stylus. The touch of the finger or stylus creates an analog signal indicating the location of the position touched. This signal is then digitized by a separate controller circuit, and the digitized coordinates are transmitted to the host processor for interpretation by the computer's software. The host processor instantaneously returns a signal to the display panel to give the user the impression that he is touching objects directly on the display panel itself. However, what is really occurring is that the computer is forwarding a feedback output to the display in response to the digitized signal received by the touching of the screen. This response may be in the form of changing color, shape, number, letter or other similar action. In the simplest sense, this system is designed to operate the computer by just touching symbols and objects displayed by the computer.

The touch screen or contact sensor is preferably a thin (i.e., approximately 0.125 inches), transparent, rigid glass plate or panel that is preferably flat, but could also be cylindrical or curved, to fit the face of the display panel to which it is mounted.

The display may be either a monochrome gas plasma display or a color liquid crystal display.

The computer preferably comprises an Intel 286®, Intel 386® or Intel 486® microprocessor having between 8–50 Mhz, 1–24 Mb of RAM, and 40–600 Mb of hard drive.

Figure 11:
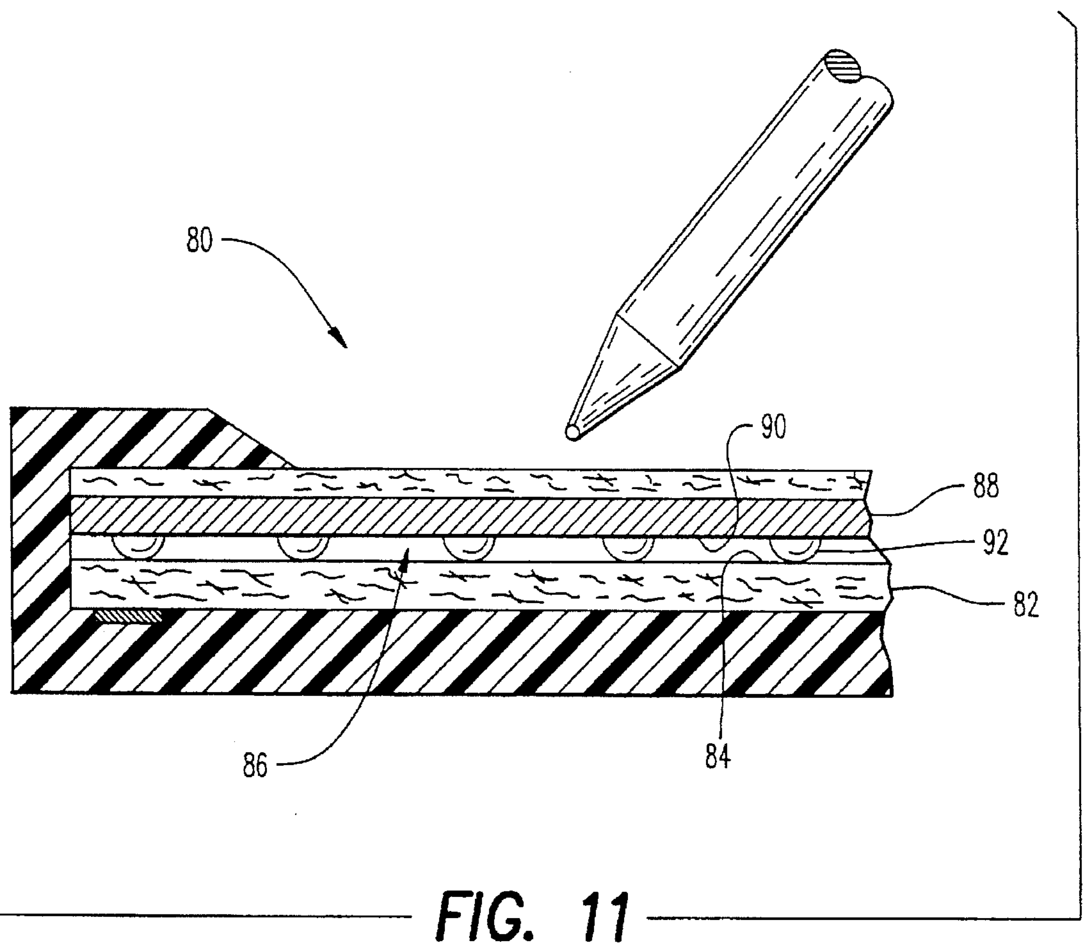
FIG. 11 is a sectional view of the contact sensor or touch screen of the touch screen input device according to the present invention.

Referring to FIG. 11, the primary element of the touch screen 80 is a glass plate or substrate 82 with a transparent, electrically resistive coating 84 on the first or upper side of the glass substrate 82. Because it is fired onto the glass substrate 82 at high temperature, this coating 84 is quite stable and durable. Gas-tight electrical contacts are then made to this coating 84, via electrical contact means 86, in such a manner as to permit it to be used as a highly stable linear voltage divider for both the X and Y axes.

A plastic contact sheet 88 with a transparent conductive coating 90 on the lower side thereof is stretched tightly over the glass substrate 82. The contact sheet 88 is held approximately 0.001 inches above the glass substrate 82 by small, clear separator points 92 as discussed in U.S. Pat. No. 3,911,215 (Hurst et al.), which issued on Oct. 7, 1975, and which is incorporated herein by reference, which are evenly distributed on the lower side of the contact sheet 88. Fiber pressure causes the contact sheet 80 to deform imperceptibly and make electrical contact, via electrical contact means 86, with the resistive coating 84 at the position of touch. The voltages picked off by the contact sheet 88 at the point of contact are the analog representation of the position touched.

A controller circuit which is separate from the touch screen impresses the voltage gradient across the resistive coating on the glass, alternating between the X and Y directions. The analog signals picked up by the contact sheet are digitized by an analog-to-digital converter in the controller, and the digitized coordinate pair is then transmitted to the computer for processing.

The overall configuration of the touch screen input device 1 according to the present invention can best be understood by referring to FIGS. 1–6, wherein a touch screen or glass 2 is between an aluminum upper housing portion 4 and an aluminum lower housing portion 6. Touch screen 2, which is preferably a transparent digitizer manufactured by Elographics, is connected to a computer by means of a five-pin ribbon cable 5 which is internally connected to port 7. A foam insulator 8, which is preferably a foam gasket such as that manufactured by Macklanburg-Duncan, is disposed between the upper surface of touch screen 2 and the inner surface of upper housing portion 4, whereby touch screen 2 does not come into contact with any hard objects so as to avoid cracking and other damage to touch screen 2. The bottom surface of touch screen 2 is removably secured to a support frame 10 by means of insulating tape 12, e.g., a foam adhesive tape manufactured by Archer. The bottom surface of support frame 10 is disposed against the upper surface of either monochrome gas plasma display unit 14 (e.g., a gas plasma display manufactured by Matsushita) or color liquid crystal display unit 16 (e.g., an active matrix LCD manufactured by Hitachi, Ltd. The display units are secured to support frame 10 by any suitable mechanical means, e.g., screws. The bottom surface of display unit 14 or 16 is disposed against lower housing portion 6 and secured to upper housing by any conventional mechanical means. Lower housing portion 6 includes an outer lip portion 20 when liquid crystal display unit 16 is incorporated therein due to it structural configuration. Display units 14 and 16 communicate with an associated computer via a ribbon cable (not shown) which is connected to port 7. Both upper and lower housing portions 4 and 6 include a plurality of vent holes 22 to permit the diffusion of heat from system 1.

It is critical according to the present invention to position touch screen 2 as close as possible to display unit 14 or 16 without touching the display so as to reduce parallax. Otherwise the user would be touching what is incorrectly believed to be displayed.

Figure 1:
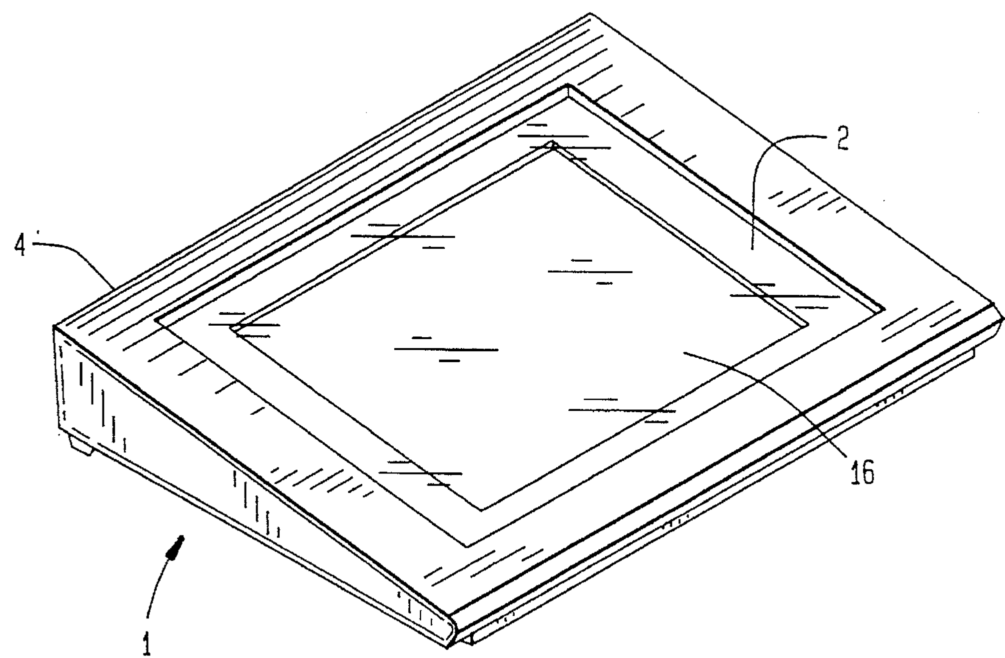
FIG. 1 is a top-left side perspective view of the touch screen input device having a color liquid crystal display monitor in accordance with one embodiment of the present invention.
Figure 2:
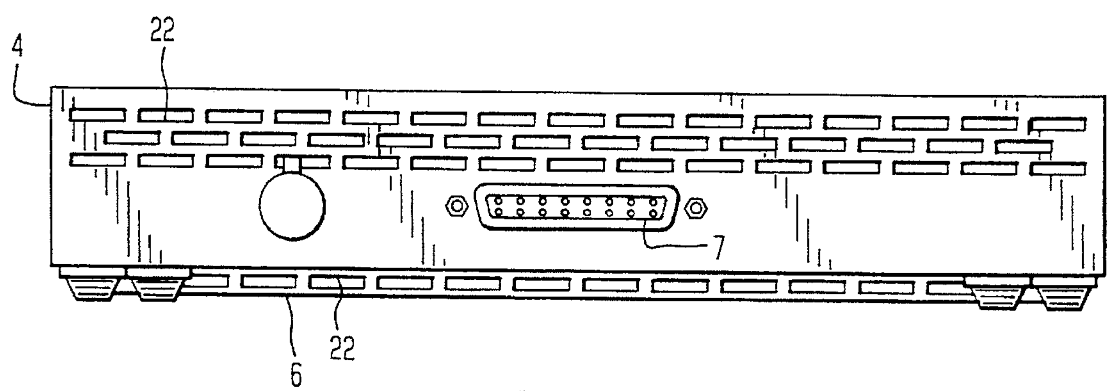
FIG. 2 is a rear side view of the touch screen input device of FIG. 1.
Figure 3:
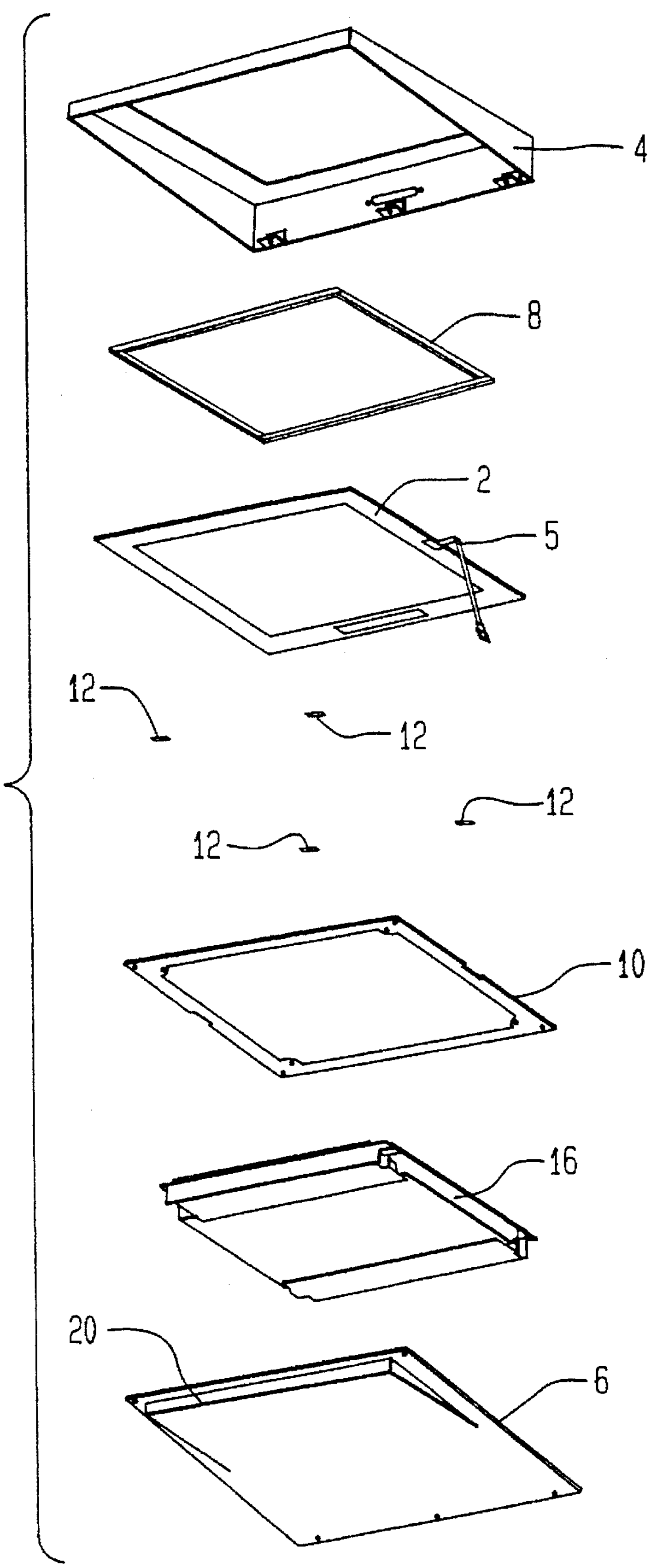
FIG. 3 is an exploded view of the touch screen input device of FIG. 1.
Figure 4:
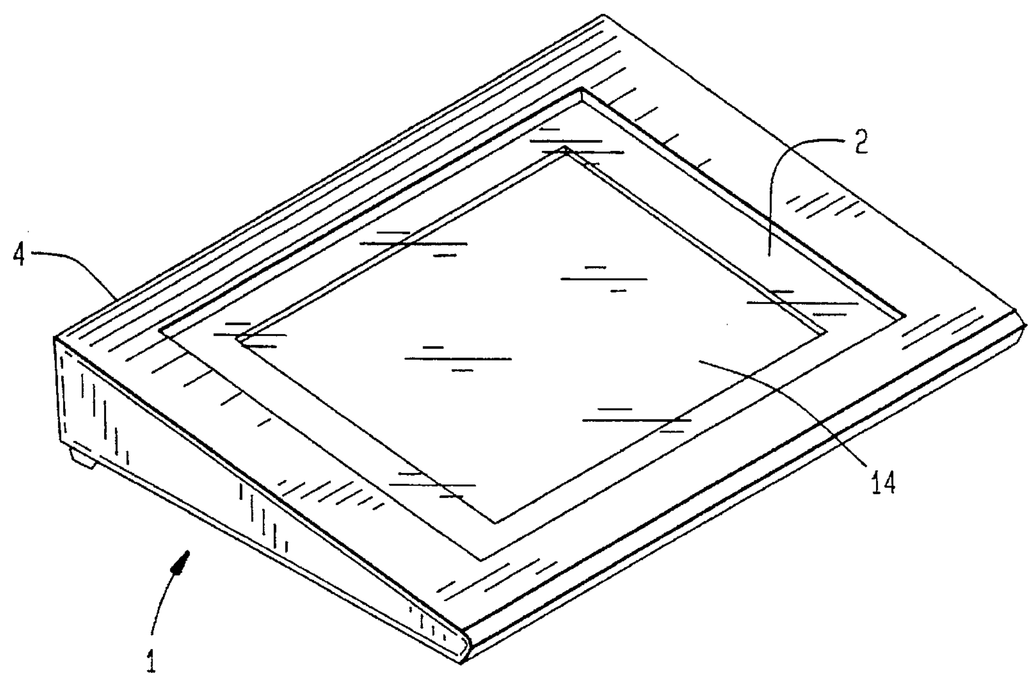
FIG. 4 is a top-left side perspective view of the touch screen input device having a monochrome gas plasma display monitor in accordance with another embodiment of the present invention.
Figure 5:
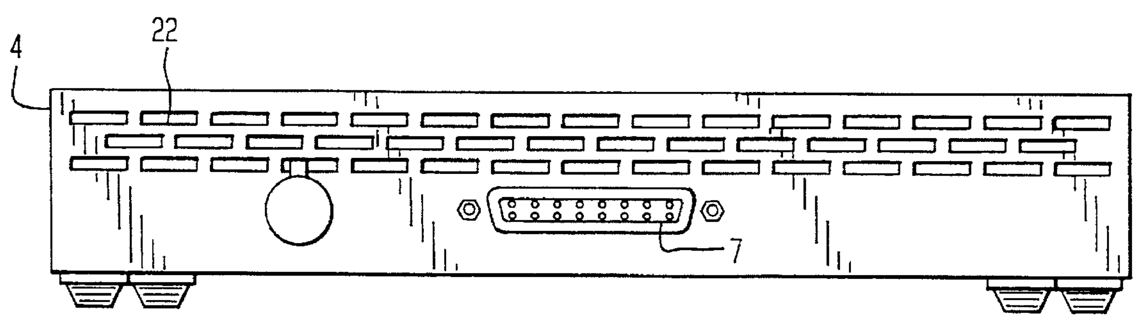
FIG. 5 is a rear side view of the touch screen input device of FIG. 4.
Figure 6:
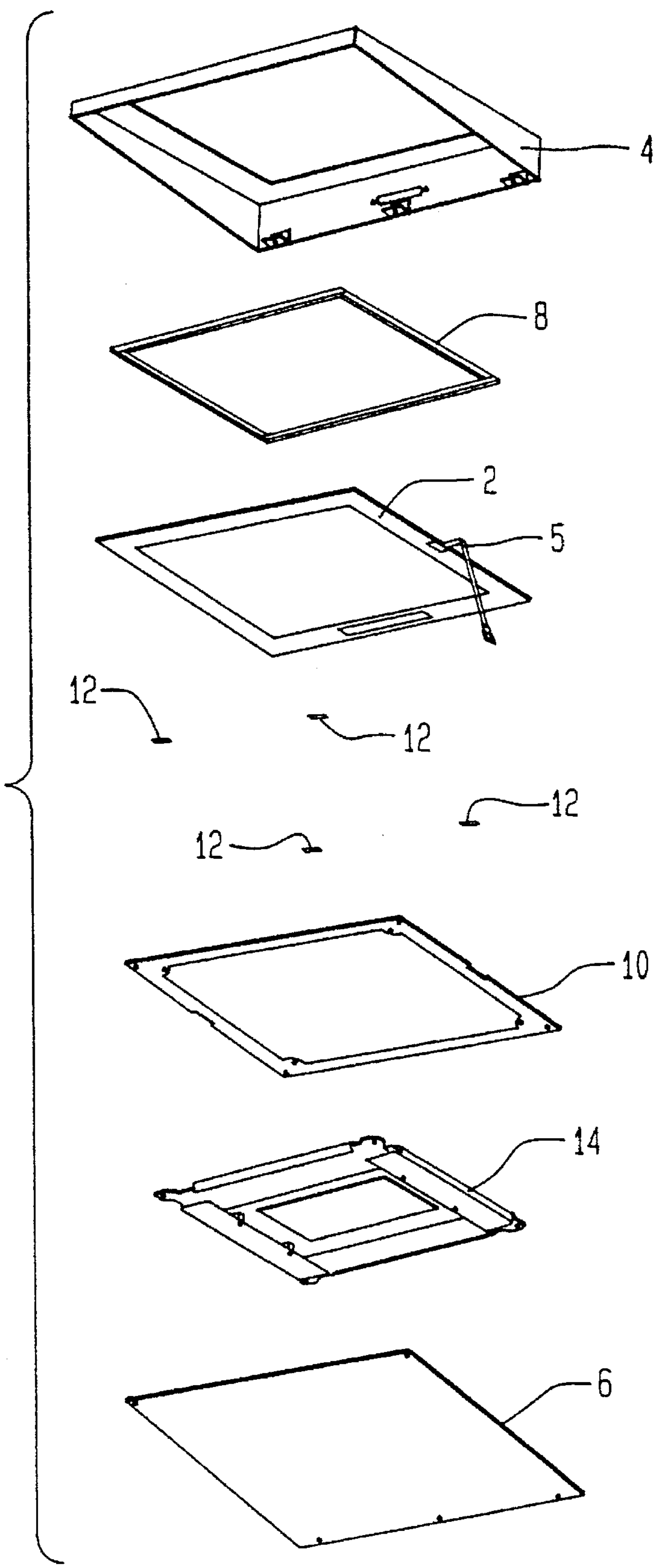
FIG. 6 is an exploded view of the touch screen input device of FIG. 4.
Figure 7:
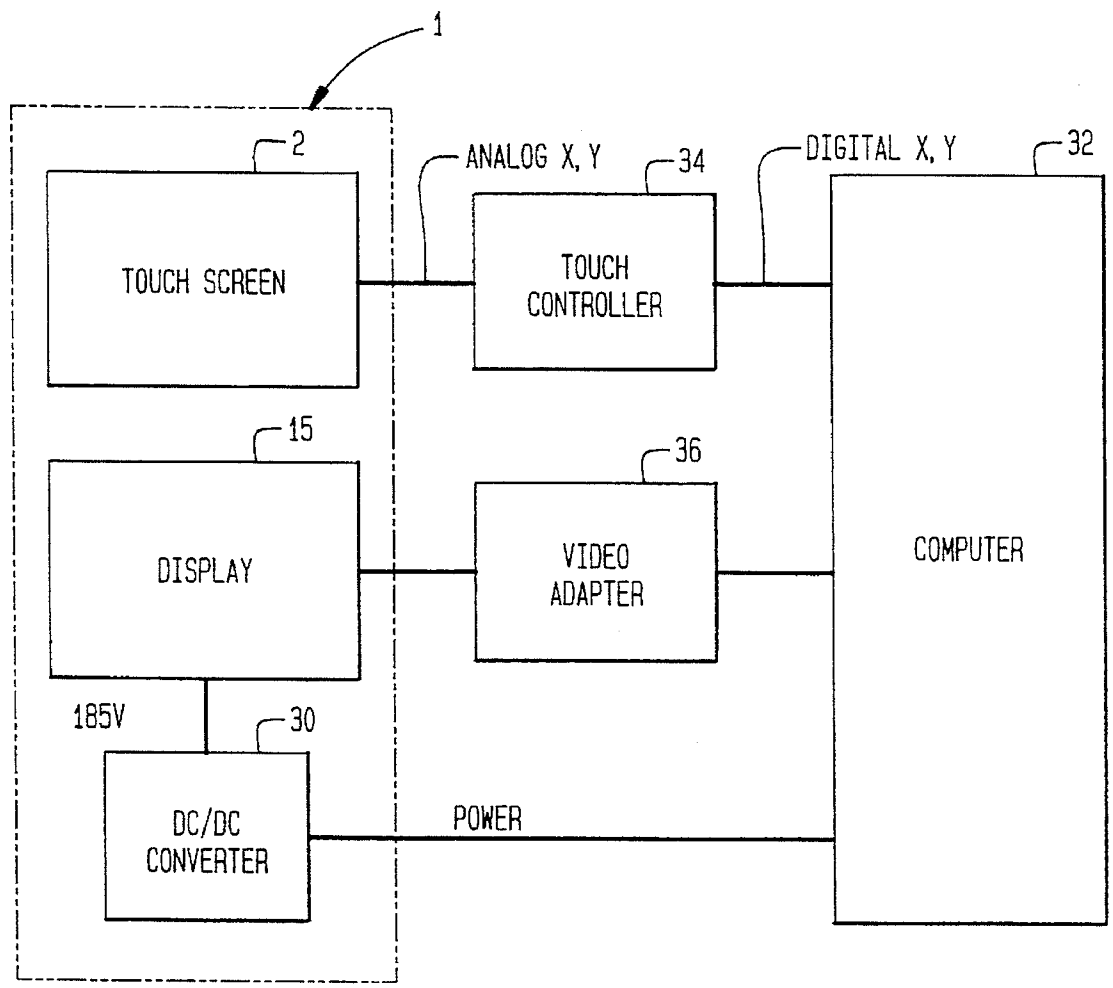
FIG. 7 is a block diagram of the components of the touch screen input device according to the present invention.

FIG. 7 is a block diagram which underscores the interactive relationship between the individual components which make up touch screen input device 1. These components include touch screen or contact sensor 2, display 15, DC/DC converter 30 (optional) and computer 32. DC/DC converter 30 is typically used together to supply power to a gas plasma display.

When a user touches contact sensor or touch screen 2 it produces two analog voltage outputs corresponding to the X,Y coordinates representative of the position touched on the screen. The voltage from touch screen 2 travels through an internal cable which is disposed within the glass of touch screen 2 to a connector disposed outside of the glass.

External to the glass are converter units or touch controller 34 (i.e., the controller typically includes both analog-to-digital converters and controller circuitry) which generate a digital X,Y coordinate. The connector, not shown, has three functions, i.e., (1) it has a section to provide power to the glass, (2) it carries a digital video connection, and (3) it has an analog touch output from the glass. The digital X,Y coordinates generated from touch controller 34 are then communicated to computer 32 which reads the digital X,Y coordinate from touch controller 34 and produces a sequence of actions. Computer 32 is connected to a video adapter 36 which produces a digital video output in accordance with output signals received from computer 32 which are the direct results of actions taken by the computer in response to the digital X,Y coordinates received by computer 32 from touch controller 34. The display then reflects the change of video signaling by displaying a changed picture on display unit 15. The reaction caused by the touching of touch screen 2 on the video output exhibited on display unit 15 directly corresponds to the software used to run computer 32.

Figure 8:
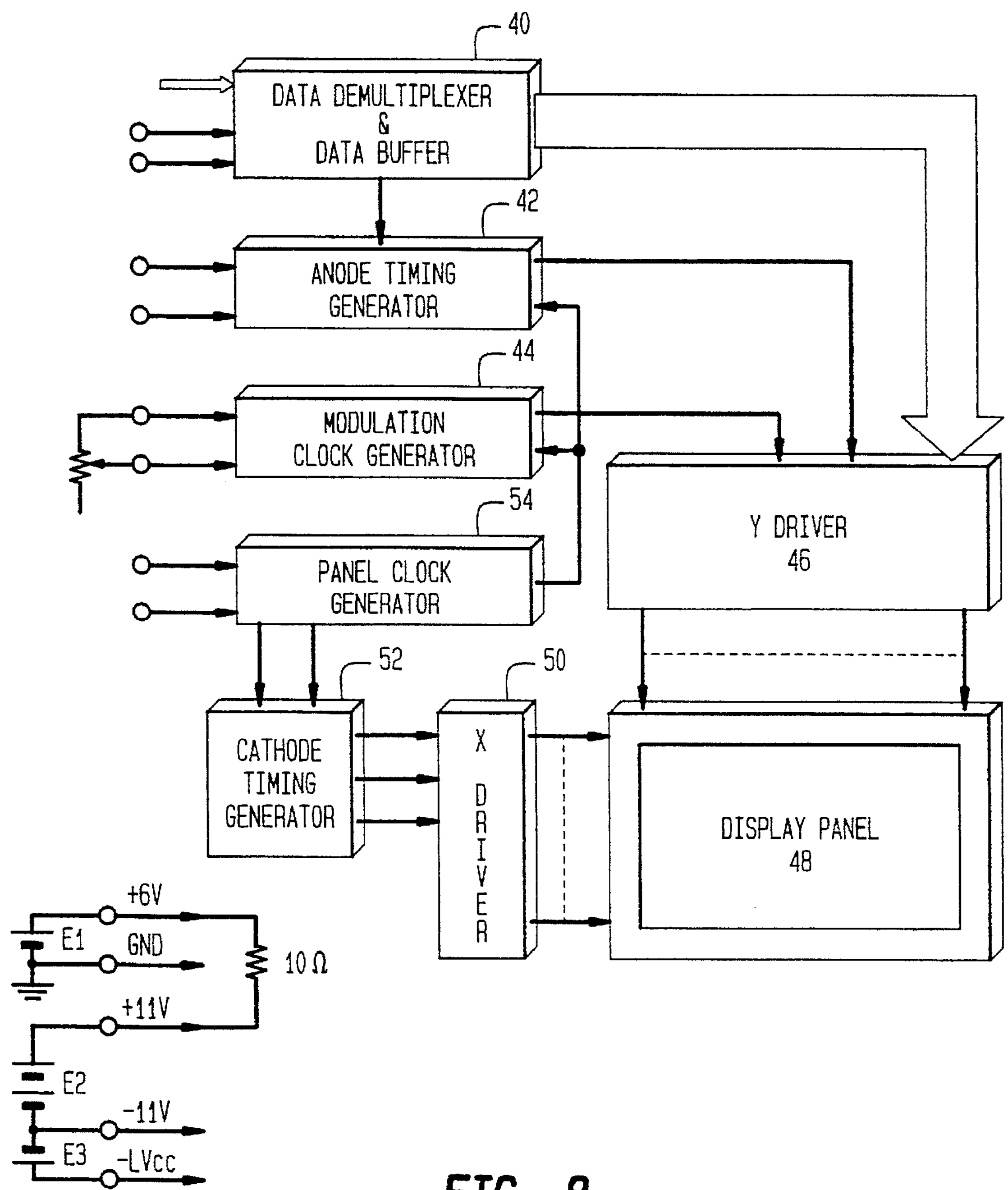
FIG. 8 is a block diagram of the monochrome gas plasma display monitor.

FIG. 8 depicts the preferred circuitry of monochrome gas plasma display 14 wherein data dexalliplexer and data buffer unit 40, anode timing generator 42 and modulation clock generator 44 provide inputs to "Y" driver 46 which in turn provides "Y" axis inputs to display panel 48. "X" axis inputs are provided to display panel 48 via "X" driver 50. "X" driver 50 receives inputs from cathode timing generator 52 and panel clock generator 54. As such, digitized X,Y signals are output from computer 32 through video adapter 36 and into their respective driver to provide the desired display which is caused by a corresponding touching of touch screen 2 by the user.

Figure 9:
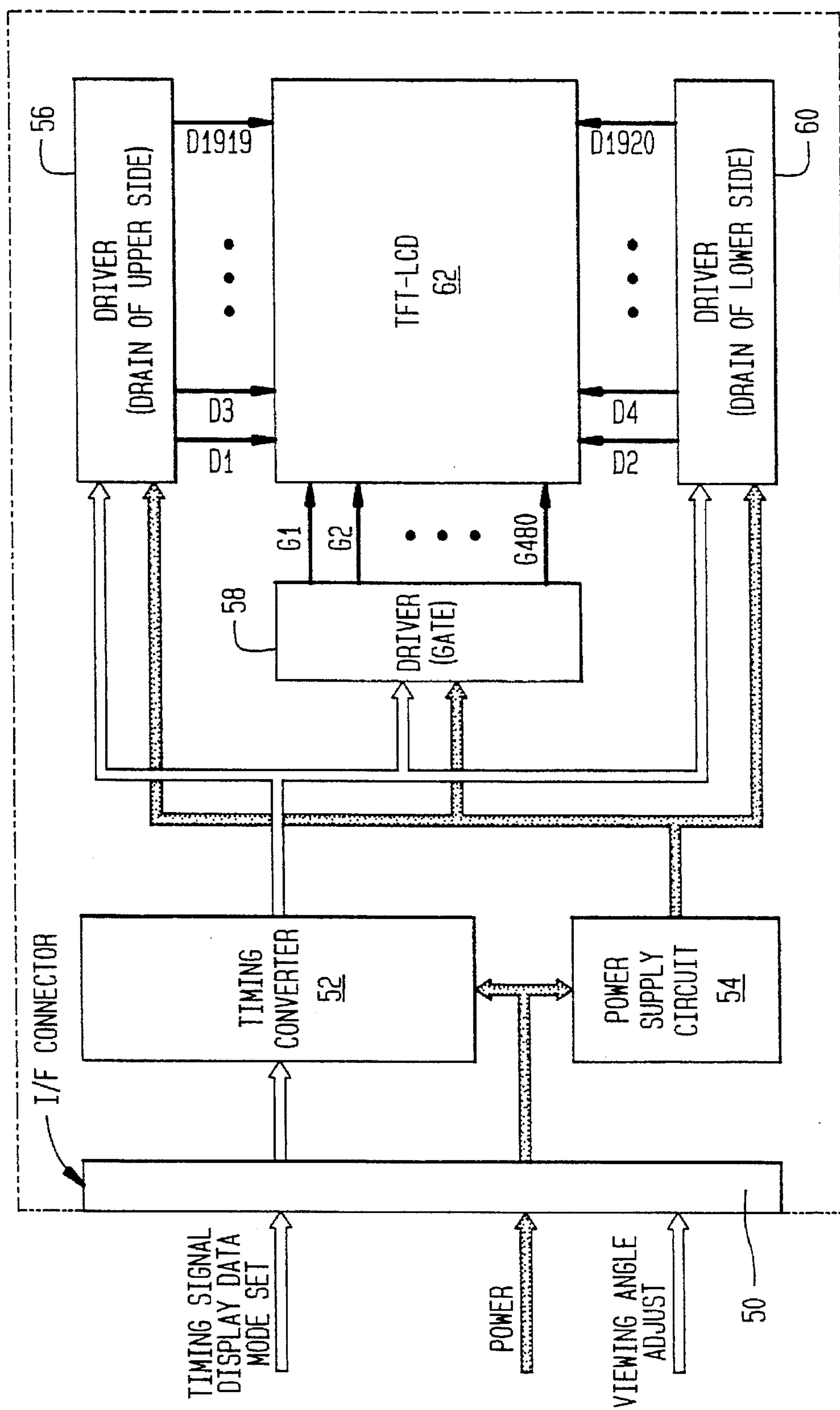
FIG. 9 is a block diagram of the color liquid crystal display monitor.

FIG. 9 depicts the preferred circuitry of color liquid crystal display unit 16 wherein an I/F connector 50 receives inputs from video adapter 36 such as timing signal display data mode set, viewing angle adjustments and power. I/F connector 50 then sends these inputs to timing converter 52 and power supply circuit 54. Both converter 52 and circuit 54 are connected in parallel to upper driver 56, gate driver 58 and lower driver 60. Gate driver 58 sends inputs to liquid crystal display 62 via gates G1 through G480. Upper driver 56 sends inputs to liquid crystal display 62 via odd drains D1, D3 . . . D919 and lower driver 60 sends inputs via even drains D2, D4 . . . 1920.

Figure 10:
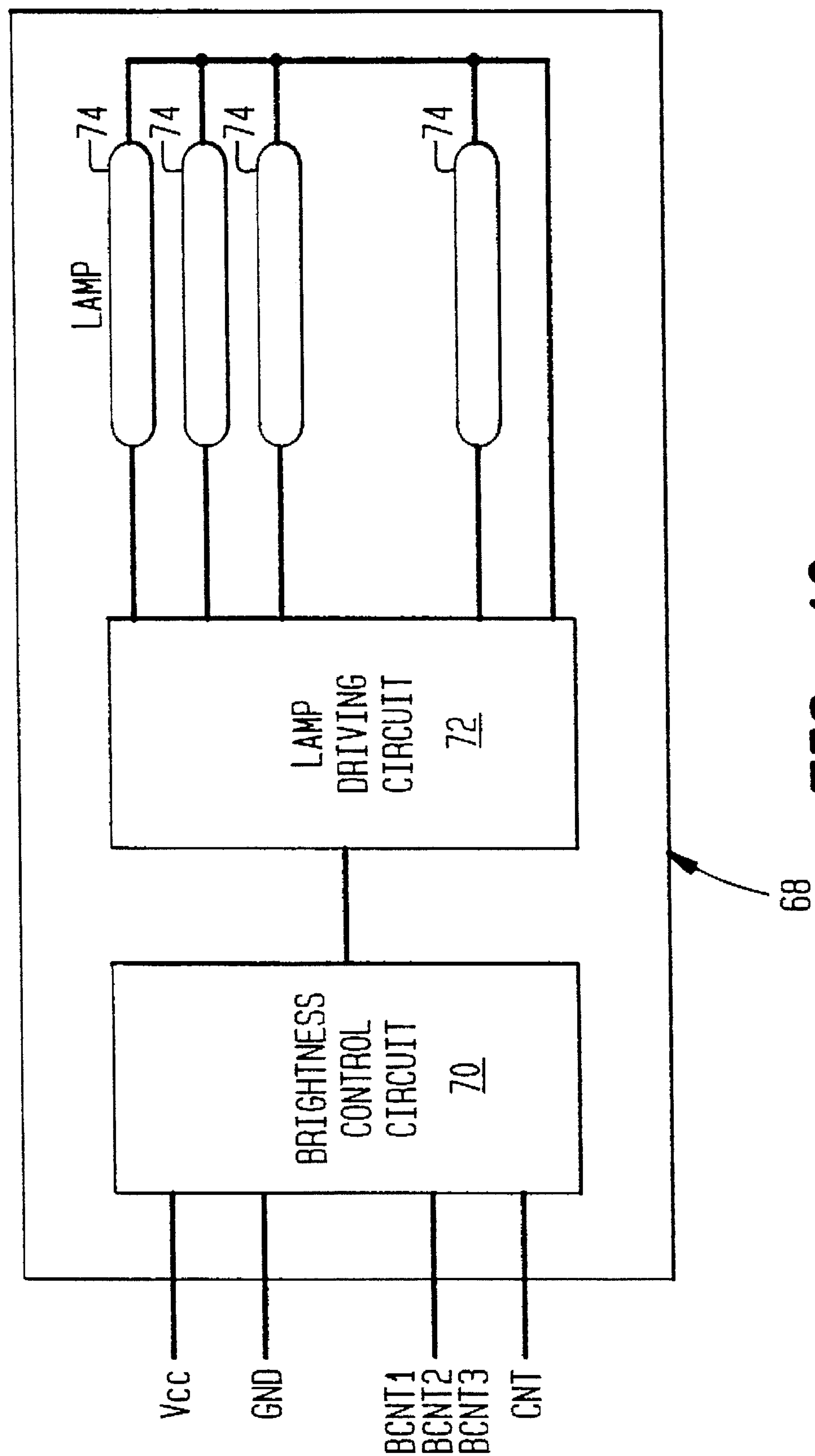
FIG. 10 is a block diagram of the back-light unit of the color liquid crystal display monitor.

FIG. 10 depicts the preferred back-light unit 68 used in conjunction with the liquid crystal display unit 16 according to the present invention, wherein a brightness control circuit 70 is connected to a lamp driving circuit 72. The lamp driving circuit is thereafter connected in parallel to various lamps 74.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A basically horizontally disposed touch screen input device comprising:

an upper housing portion;

a horizontally disposed lower housing portion;

a touch screen disposed between said upper housing portion and said lower housing portion, wherein said touch screen is horizontally disposed, said touch screen comprising:

a glass plate having a first side;

a transparent, electrically resistive coating on the first side of said glass plate; and a contact sheet positioned adjacent said resistive coating on the first side of said glass plate, said contact sheet having a transparent conductive coating and having separator points so that said contact sheet is not in direct contact with said resistive coating, wherein the contact sheet contacts said resistive coating when pressure is applied to said contact sheet;

a foam gasket disposed between said contact sheet of said touch screen and said upper housing portion to prevent cracking and other damage to said touch screen;

a frame support means disposed between said touch screen and said lower housing portion;

means disposed between said glass plate of said touch screen and said frame support means for insulating said glass plate from said frame support;

a display means disposed between said frame support means and said lower housing portion; and communication means for sending signals from said touch screen to an externally disposed computer means, and for receiving signals from said externally disposed computer means.

2. The device according to claim 1, wherein said touch screen produces an analog signal indicative of a touched position on said touch screen.

3. The device according to claim 1, wherein said display means is a gas plasma display.

4. The device according to claim 3, wherein said display means is powered by a DC/DC converter.

5. The device according to claim 1, wherein said display means is a liquid crystal display.

6. The device according to claim 1, further comprising a controller circuit that is capable of impressing the voltage gradient across the resistive coating on said glass plate, alternating between the X and Y directions.

* * * * *